United States Patent [19]

Richardson et al.

[11] Patent Number: 4,779,415

[45] Date of Patent: Oct. 25, 1988

[54] MANIFOLD TUNING STRUCTURE

[75] Inventors: Larry E. Richardson, Columbus; Frank L. Zagar, Seymour; George R. Snyder, Columbus, all of Ind.

[73] Assignee: Arvin Industries, Inc., Columbus, Ind.

[21] Appl. No.: 935,034

[22] Filed: Nov. 26, 1986

[51] Int. Cl.⁴ .............................................. F01N 7/10
[52] U.S. Cl. ..................................... 60/313; 181/240; 181/250; 181/273
[58] Field of Search ......................... 60/313, 312, 323; 181/240, 250, 273

[56] References Cited

U.S. PATENT DOCUMENTS

| | | | |
|---|---|---|---|
| 1,760,557 | 5/1930 | Jupp | 181/240 |
| 2,124,489 | 7/1938 | Hurlock | 181/240 |
| 2,297,046 | 9/1942 | Bourne | 181/250 |
| 3,396,812 | 8/1968 | Wilcox | 181/250 |
| 4,281,741 | 8/1981 | Blaser | 181/250 |

FOREIGN PATENT DOCUMENTS 356018  7/1922  Fed. Rep. of Germany ...... 181/240

Primary Examiner—Douglas Hart
Attorney, Agent, or Firm—Barnes & Thornburg

[57] ABSTRACT

An exhaust manifold for attachment to an engine having a plurality of exhaust ports is provided. The exhaust manifold includes an exhaust conduit that is in fluid communication with selected exhaust ports, with the exhaust conduit being formed to include separate primary and auxiliary outlet openings. The exhaust manifold also includes a tuning tube that is formed to include an inlet opening that is in acoustic communication with the auxiliary outlet opening, and an outlet opening. The exhaust manifold also has a chamber for providing a static volume that is in acoustic communication with the outlet opening of the tuning tube.

17 Claims, 1 Drawing Sheet

MANIFOLD TUNING STRUCTURE

BACKGROUND AND SUMMARY OF THE INVENTION

The present invention relates to exhaust systems for vehicles having internal-combustion engines. More particularly, the present invention relates to an exhaust system for a vehicle that includes an improved silencing system for an exhaust manifold of the vehicle which complements the silencing capability of the muffler system to improve the overall performance of the total exhaust system.

Conventional exhaust systems for vehicles having internal-combustion engines generally include an exhaust manifold for gathering exhaust pulses from one or more cylinders. The exhaust manifold is then coupled through an exhaust pipe to a muffler that is intended to dampen the sound produced by the engine. In most vehicles, the muffler is spaced-apart from the engine and exhaust manifold by a considerable distance. Generally, the pipe connecting the exhaust manifold and the input of the muffler is necessarily formed to include several turns and bends so that it can be routed through the vehicle structure to the location where the muffler is mounted on the vehicle.

Noise in the exhaust system arises from acoustic pressure waves that are generated by the sudden release of exhaust gases from the individual cylinders of the vehicle engine. These acoustic pressure waves travel from the exhaust manifold through the exhaust pipe to the muffler. In most vehicles, the exhaust manifold collects exhaust pulses from more than one cylinder. Because these exhaust pulses are emitted into the exhaust manifold at different times, the pulses create acoustic pressure waves that may interact with each other to cause acoustic pressure points within the exhaust system where the acoustic pressure is increased. Further, as the pressure waves travel through the exhaust pipe toward the muffler, each bend and turn in the pipe changes the pressure waves somewhat. Generally, the pressure waves are changed because each bend or turn in the pipe reflects a portion of the wave, which causes the reflected waves to interfere with the primary waves to change the frequency of the acoustic pressure waves as they travel toward the muffler. Thus, although the pressure waves emitted into the exhaust manifold from the engine are of a generally uniform frequency, as the pressure waves interact and travel through the exhaust pipe toward the muffler, the frequency spectrum of the acoustic waves is generally increased somewhat.

In order to dampen these acoustic waves to reduce the sound emitted by the vehicle, it is known to incorporate resonance chambers in the muffler which act to attenuate the acoustic waves. A known type of resonance chamber is a Helmholtz resonator which generally consists of a cavity chamber that includes an input tube which communicates with the flow of the acoustic pulses or waves in the muffler. As the acoustic waves travel along the interior of the muffler, the pulsating waves impact upon the input tube to the cavity chamber which creates pressure variations within the chamber. These pressure variations within the chamber tend to attenuate or dampen the amplitude of the acoustic waves. Thus, the resonance chamber absorbs energy from the acoustic waves, which acts to silence somewhat the noise emitted from the muffler. In addition, acoustic energy that enters the cavity is returned to the muffler with a phase relationship that causes the returned energy to be reflected back toward the source. The resonance chamber is frequency specific, in that a specific resonance chamber is only able to dampen and reflect acoustic waves of a very narrow frequency band or spectrum. If the resonator is located in a position at which the acoustic waves in the system are varying with a particular frequency the resonator is tuned to suppress, the resonator will absorb energy from the acoustic wave. Because the frequency spectrum of the acoustic waves generally increases considerably as they travel toward the muffler, it is generally necessary to include several resonance chambers of different sizes in the muffler to dampen the acoustic waves of different frequencies.

One problem with the known type of exhaust systems is that the muffler must include several different sizes of resonance chambers in order to adequately attenuate the different frequencies of the acoustic waves as they reach the muffler. This normally increases the size and complexity of the muffler considerably.

Another problem with the known exhaust systems is that, depending upon the engine type, it is sometimes extremely difficult to attenuate the acoustic waves to an acceptable level simply by using resonance chambers in the muffler. It is known to add a separate resonator component near the muffler in the exhaust system to increase the attenuation of the acoustic waves in some systems. However, this increases the complexity of the system by requiring another component, and also increases the cost of the exhaust system.

One object of the present invention is to provide an exhaust system that exhibits increased attenuation of exhaust noise over the known systems.

Another object of the present invention is to provide an exhaust system that exhibits increased attenuation without the necessity of increasing the complexity and size of the muffler component itself.

Yet another object of the present invention is to provide an exhaust system in which a resonance chamber is provided in the system at a location where the frequency spectrum of the acoustic waves produced by the engine is relatively narrow.

According to the present invention, an exhaust manifold for attachment to an engine having a plurality of exhaust ports is provided. The exhaust manifold includes an exhaust conduit that is in fluid communication with selected exhaust ports, with the exhaust conduit being formed to include separate primary and auxiliary outlet openings. The exhaust manifold also includes a tuning tube that is formed to include an inlet opening that is in acoustic communication with the auxiliary outlet opening, and an outlet opening. The exhaust manifold also has chamber means for providing a static volume that is in acoustic communication with the outlet opening of the tuning tube.

One feature of the foregoing structure is that a tuning tube and corresponding chamber means are provided in the exhaust manifold for attenuating a selected frequency spectrum of the acoustic or sound pressure waves generated by the engine. One advantage of this feature is that by locating the tuning tube and chamber means in the exhaust manifold, the tuning tube and chamber means are located at the optimum position within the exhaust system of the vehicle to attenuate the sound pressure waves emitted by the engine most efficiently. Another advantage of the foregoing structure is that by locating the tuning tube and chamber means in the exhaust manifold, a single tuning tube and chamber means are able to attenuate a significant portion of the sound emitted by the engine, without the necessity of providing a plurality of tuning tubes and chamber means.

In preferred embodiments of the present invention, the tuning tube has a predetermined diameter and effective lengt that are selected to cause the tuning tube and the chamber means to cooperate to attenuate at least a predetermined frequency present in the exhaust conduit during discharge of combustion product through the exhaust ports upon operation of the engine. One feature of the foregoing structure is that the dimensions of the tuning tube are selected to cooperate with the chamber means to attenuate a predetermined frequency spectrum created by the exhaust pulses of the engine before the frequency spectrum of the exhaust pulses or acoustic waves has increased. One advantage of this feature is that the tuning tube can be selected to attenuate the primary noise producing acoustic waves before these acoustic waves have exited the exhaust manifold. This permits the tuning tube to be closely matched with the frequency of the maximum noise producing acoustic waves.

Also in preferred embodiments of the present invention, the predetermined location of the auxiliary outlet opening is selected to position the auxiliary outlet opening in close proximity to an acoustical pressure point in the exhaust conduit. One feature of the foregoing structure is that the inlet to the tuning tube is positioned in close proximity to the location of one of the acoustical pressure points in the exhaust conduit. One advantage of this feature is that by locating the tuning tube in such a position, the frequency attenuation characteristics of the tuning tube and the chamber means are enhanced.

Also in preferred embodiments of the present invention, the chamber means is configured to surround the exhaust conduit to provide a static volume for the tuning tube and in addition, to provide insulation means for retaining heat energy in the exhaust conduit. One feature of the foregoing structure is that the chamber means functions to provide both the static volume for the tuning tube, and insulation means for the exhaust conduit. One advantage of this feature is that the chamber means acts to limit heat energy dissipation to the surrounding engine compartment so that heat energy in the combustion product is discharged substantially through the primary outlet opening.

Thus, the exhaust manifold of the present invention provides improved silencing for the entire exhaust system by attenuating selected noise frequencies emitted by the engine directly in the exhaust manifold. By controlling selected noise frequencies directly in the exhaust manifold, these selected frequencies can be substantially attenuated before they exit the exhaust manifold. This increases the silencing ability of the entire exhaust system because the muffler in the system will have fewer acoustic frequencies to attenuate. Thus, the silencing capability of the entire exhaust system is enhanced without increasing the size or complexity of the muffler itself.

Additional objects, features, and advantages of the invention will be apparent to those skilled in the art upon consideration of the following detailed description of preferred embodiments exemplifying the best mode of carrying out the invention as presently perceived.

DETAILED DESCRIPTION OF THE DRAWINGS

Figure 1:
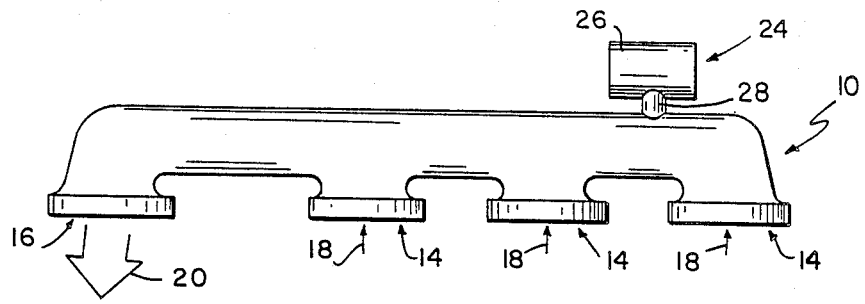
FIG. 1 is a top plan view of a manifold and resonator arrangement that illustrates the function of the present invention.

Referring now to FIG. 1, FIG. 1 shows an exhaust manifold 10 similar to the type that may be attached to an engine block (not shown) of a vehicle engine for gathering exhaust pulses from the engine. The manifold 10 includes inlet openings 14 that gather the exhaust pulses from the individual cylinders (not shown) and an outlet opening 16 for routing the exhaust pulses or combustion product to a remaining portion (not shown) of an engine exhaust system. The exhaust pulses directed into the openings 14 are illustrated by arrows 18, while the combustion product exiting from the outlet 16 is illustrated by the arrow 20. A resonator 24 is shown attached to the manifold 10 for attenuating acoustic pressure waves (not shown) of a selected frequency that are generated in the manifold 10 by the sudden release of the exhaust pulses from the individual cylinders of the engine.

Illustratively, the resonator 24 includes a chamber 26 of a preselected volume that is coupled to the manifold 10 by a tube 28. The tube 28 has a preselected diameter and length that combine with the preselected volume of the chamber 26 to produce a resonator 24 that will attenuate a selected frequency of acoustic pressure waves within the manifold 10. In a known manner, the acoustic waves travel along the interior of the manifold 10 and impact upon the tube 28 and chamber 26 which creates pressure variations within the chamber 26. These pressure variations within the chamber 26 tend to attenuate or dampen the amplitude of the acoustic waves. In addition, the presence of the resonator 24 causes a portion of the acoustic waves to be reflected back toward the source, which further reduces the magnitude of the acoustic waves that leave the manifold 10 toward the remaining portion of the exhaust system.

The exhaust pulses 18 interact within the exhaust manifold 10 to create acoustic pressure points (not shown) within the manifold 10 where the acoustic pressure is increased. The location of acoustic pressure points will vary within the manifold 10 depending upon several factors, including the number of cylinders in the engine and the firing sequence of the cylinders. Advantageously, the resonator 24 is located at one of these acoustic pressure points that, in the illustrated embodiment, is in close proximity to one of the inlet openings 14 to enhance the attenuation of the acoustic pressure waves. Furthermore, because the resonator 24 is limited to attenuating acoustic waves in only a relatively narrow frequency spectrum, the size of the chamber 26, as well as the diameter and length of the tube 28, are selected so that the resonator 24 is tuned to attenuate a selected frequency of the acoustic waves that will ideally improve the overall exhaust sound quality emitted from the exhaust system.

By locating the resonator 24 in the manifold 10 in close proximity to one of the acoustic pressure points, the resonator 24 is able to attenuate the selected frequency spectrum of the acoustic waves before they exit the manifold 10, which enhances the overall silencing capability of the entire exhaust system. In addition, by eliminating a preselected frequency spectrum in the manifold 10, a muffler component (not shown) in the exhaust system can be more effective without the necessity of increasing the complexity and size of that muffler.

Figure 2:
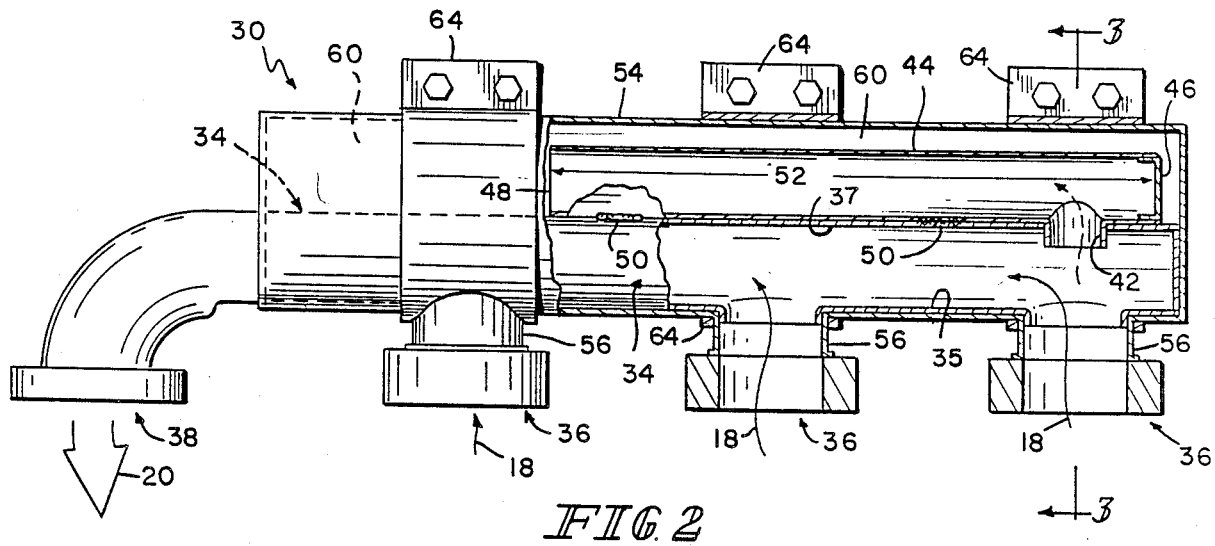
FIG. 2 is a top plan view with portions broken away of a manifold and resonator arrangement according to the preferred embodiment of the present invention.

FIG. 2 shows a manifold 30 according to the preferred embodiment of the present invention. The manifold 30 includes an exhaust conduit or manifold tube 34 that includes a first sidewall 35 and a second sidewall 37. The first sidewall 35 is formed to include inlet openings 36 for receiving exhaust pulses 18 from individual cylinders (not shown) of a vehicle engine (not shown). The manifold tube 34 also includes a primary outlet opening 38 for directing the combustion product 20 gathered in the manifold tube 34 toward a remaining portion of the exhaust system (not shown). Illustratively, the manifold tube 34 is fabricated from sheet metal. It will be understood that the manifold tube 34 could be formed by casting without affecting its function.

Figure 3:
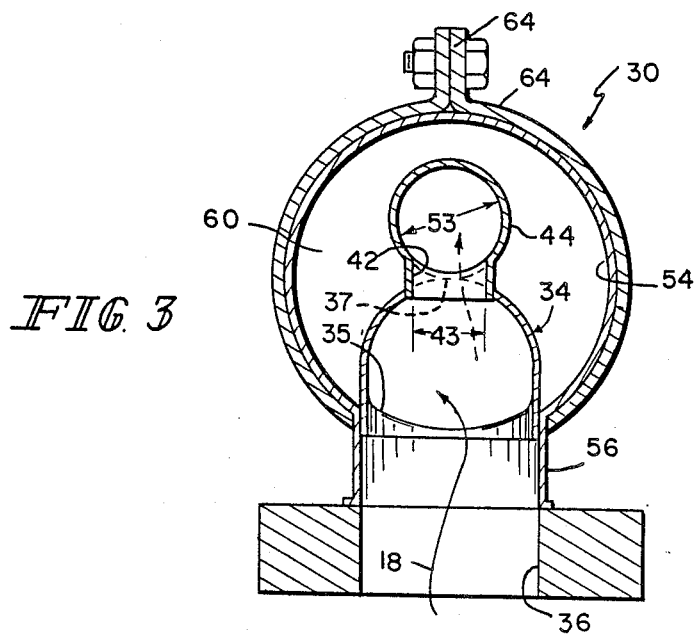
FIG. 3 is an enlarged cross-sectional view taken along lines 3—3 of FIG. 2.

The second sidewall 37 of the manifold tube 34 is formed to include a secondary outlet opening 42 having a specified diameter illustrated by the number 43 (FIG. 3). A cylindrically shaped, elongated tuning tube 44 is disposed in parallel relation to the manifold tube 34, and includes a closed end 46 and an open end 48. The tuning tube 44 communicates with the manifold tube 34 through the secondary outlet opening 42. The tuning tube 44 has a preselected diameter indicated by the number 53 (FIG. 3), and a preselected length indicated by the number 52 (FIG. 2). The tuning tube 44 is rigidly attached to the outer side of the second sidewall 37 by welds 50. It will be understood that other means of attaching the tuning tube 44 to the manifold tube 34 may be used, and that the welds 50 are illustrative only.

A generally cylindrically-shaped shroud 54 is disposed around the manifold tube 34 and tuning tube 44 to provide a chamber means of a preselected volume. The shroud 54 includes shroud openings 56 that seal around the inlet openings 36 and the manifold tube 34. The shroud 54 is sealed at both ends, as well as around the inlet openings 36, to provide a sealed chamber to provide a static volume 60 of a preselected size. Illustratively, the shroud 54 is fabricated from sheet metal. The open end 48 of the tuning tube 44 is configured to be in fluid communication with the static volume 60.

It will be understood that the secondary outlet opening 42 and the tuning tube 44 cooperate to form a tube that is somewhat analogous to the tube 28 illustrated in FIG. 1. It will be further understood that the static volume 60 generally corresponds to the chamber 26 of the resonator 24 shown in FIG. 1.

The diameter 43 of the secondary outlet opening 42, the diameter 53 and length 52 of the tuning tube 44, and the size of the static volume 60 are all selected to cooperate to form a resonator in the manifold 30 that will attenuate a preselected frequency spectrum of acoustic waves that are collected by the manifold 30. In addition, the location of the secondary outlet opening 42 is selected to be in close proximity to an acoustic pressure point that is created within the manifold 30 by the interacting pulses 18 that enter the manifold 30. In the preferred embodiment illustrated in FIG. 2, the secondary outlet opening 42 is located substantially opposite the inlet opening 36 furthest from the outlet opening 38. It will be understood that the location of the secondary outlet opening 42 may be different depending upon the characteristics of the engine (not shown) that the manifold 30 is connected to. Clamps 64 are provided that encircle the shroud 54 and shroud openings 56 to increase the strength of the shroud 54 and manifold 30.

FIG. 3 shows in greater detail the configuration of the tuning tube 44 and the manifold tube 34 within the shroud 54. Specifically, FIG. 3 shows the orientation of the manifold tube 34 in acoustic communication with the tuning tube 44 through the secondary outlet opening 42. FIG. 3 also shows the cooperation of the shroud 54 with the manifold tube 34 and tuning tube 44 to create the static volume 60 that provides the cavity means for the resonator within the manifold 30. It will be understood that the size of the static volume 60 is substantially equal to the volume defined by the shroud 54, less the volume taken up within the shroud 54 by the manifold tube 34. As stated previously, the size of the static volume 60 is selected to complement the selected dimensions of the tuning tube 44 and outlet 42 to create a resonator within the manifold 30 that will advantageously attenuate a selected frequency spectrum of acoustic waves within the manifold 30.

In operation, the manifold 30, with the dimensions of the components selected as previously described, is attached to an engine (not shown) of a motor vehicle. Specifically, the inlet openings 36 are attached to the individual cylinders (not shown) of the engine such that the inlet openings 36 are in direct fluid communication with the exhaust outlets of the individual cylinders. As the engine operates, exhaust pulses 18 from the individual cylinders enter the manifold tube 34 and interact to form acoustic waves within the manifold tubes 34. As the acoustic waves travel along the interior of the manifold tube 34, the waves impact upon the tuning tube 44, which creates pressure variations within the tube 44 and static volume 60. These pressure variations within the tube 44 and static volume 60 tend to attenuate or dampen the amplitude of the acoustic waves. Thus, the tuning tube 44 and static volume 60 absorb energy from the acoustic waves. In addition, acoustic waves that enter the tube 44 are returned to the manifold tube 34 with a phase relationship that causes the return waves to be reflected back toward the source. This reflection of a portion of the acoustic waves further enhances the attenuation of the waves within the manifold tube 34. By attenuating a selected frequency spectrum of acoustic waves within the manifold tube 34, the muffler component (not shown) is able to more effectively silence the noise emitted by the exhaust system without increasing the number of resonators within the muffler component.

Although the invention has been described in detail with reference to certain preferred embodiments, variations and modifications exist within the scope and spirit of the invention as described and defined in the following claims.

What is claimed is:

1. An exhaust manifold for attachment to an engine having a plurality of exhaust ports, the exhaust manifold comprising an exhaust conduit in fluid communication with selected exhaust ports, the exhaust conduit being formed to include separate primary and auxiliary outlet openings, a tuning tube being formed to include an inlet opening in acoustic communication with said auxiliary outlet opening and an outlet opening, and chamber means for providing a static volume in acoustic communication with the outlet opening of the tuning tube, the chamber means being configured to provide insulation means for retaining heat energy in the exhaust conduit to limit heat energy dissipation to a surrounding engine compartment so that heat energy in combustion product discharged from the selected engine exhaust ports is exhausted substantially through the primary outlet opening.

2. The exhaust manifold of claim 1, wherein the tuning tube has a predetermined diameter and effective length selected to cause the tuning tube and the chamber means cooperatively to attenuate at least a predetermined frequency extant in the exhaust conduit during discharge of combustion product through the exhaust ports upon operation of the engine.

3. The exhaust manifold of claim 1, wherein the predetermined location of the auxiliary outlet opening is selected to position the auxiliary outlet opening in close proximity to an acoustic pressure point in the exhaust conduit having a selected magnitude extant during discharge of combustion product through the exhaust ports upon operation of the engine, thereby enhancing frequency attenuation characteristics of the tuning tube and the chamber means.

4. The exhaust manifold of claim 1, wherein the exhaust conduit includes a first elongated side wall portion formed to include inlet means for admitting combustion product discharged from the selected engine exhaust ports into the exhaust conduit and a second elongated side wall portion configured to provide the auxiliary outlet opening at a predetermined location along the length of the second elongated side wall portion selected to enhance frequency attenuation characteristics of the tuning tube and the chamber means.

5. The exhaust manifold of claim 4, wherein the predetermined location of the auxiliary outlet opening is selected to position the auxiliary outlet opening in close proximity to an acoustic pressure point in the exhaust conduit having a selected magnitude extant during discharge of combustion product through the exhaust ports upon operation of the engine.

6. The exhaust manifold of claim 4, wherein the first and second elongated side wall portions are situated in spaced-apart confronting relation.

7. The exhaust manifold of claim 1, wherein the tuning tube includes a cylindrical shell closed at one end and open at an opposite end to provide the outlet opening and the cylindrical shell is configured to provide the inlet opening in a selected location intermediate the two ends.

8. The exhaust manifold of claim 7, wherein the chamber means is connected to the exhaust conduit to define an interior region therebetween having a volume equivalent to the static volume, and the tuning tube is positioned in the interior region.

9. The exhaust manifold of claim 8, wherein the exhaust conduit includes an exterior surface and further comprising coupling means for rigidly connecting the cylindrical shell to the exterior surface of the exhaust conduit so that the auxiliary outlet opening and the inlet opening are fixed in aligned relation to permit acoustical communication between the exhaust conduit and the tuning tube.

10. The exhaust manifold of claim 1, wherein the exhaust conduit includes an exterior surface and the chamber means is positioned to surround the exterior surface of the exhaust conduct to provide a thermally insulative gap therebetween.

11. The exhaust manifold of claim 1, wherein the chamber means is positioned in spaced-apart relation to the exhaust conduit and the tuning tube is arranged to interconnect the exhaust conduit and the chamber means in fluid communication.

12. An exhaust manifold for directing exhaust pulses produced by cylinders of an internal combustion engine away from said cylinders, the exhaust manifold comprising, a manifold tube having a specified length and formed to include inlet ports for receiving the exhaust pulses from the cylinders and an outlet port for directing said exhaust out of said manifold tube, means for acoustically tuning the manifold tube, said acoustic tuning means including a tuning tube configured to be in fluid communication with said manifold tube, and means for providing a static volume of a predetermined size for the tuning tube, whereby selected acoustic frequency components of the exhaust pulses are attentuated, said means for providing a static volume including a shroud defining a sealed space of a selected size that encircles said manifold tube and said tuning tube, said tuning tube and said shroud configured such that one end of said tuning tube is in fluid communication with said shroud space.

13. The exhaust manifold of claim 12, wherein said manifold tube is formed to include an opening having a specified diameter at a selected location along the length of the manifold tube to provide the fluid communication between the manifold tube and the tuning tube.

14. The exhaust manifold of claim 13, wherein the location of said manifold tube opening is selected to coincide with an acoustic pressure point formed within said manifold tube by said exhaust pulses emitted from said cylinders.

15. The exhaust manifold of claim 13, wherein said tuning tube is an elongated, cylindrically-shaped tube having a specified diameter and a specified length, and wherein said specified diameter and length of said tuning tube and said specified diameter of said manifold tube opening and said sealed space size are collectively selected depending on the frequency of the desired acoustic frequency components that are to be attenuated.

16. An exhaust manifold assembly for an internal combustion engine having cylinder exhaust ports, said assembly comprising an elongated manifold tube providing inlet ports spaced therealong for connection to said exhaust ports and an outlet port, a manifold shroud enclosing a portion of said tube and providing a static volume space about said tube portion, said manifold shroud extending along and surrounding said tube portion, and a tuning tube providing a connection between said manifold tube and said space, said tuning tube extending along said manifold tube and within said shroud.

17. The assembly of claim 16, wherein said tuning tube has an elongated, cylindrical shape and includes a closed end and an open end, said open end is configured to communicate with said static volume space, and said tuning tube is formed to include an inlet opening in a selected location intermediate the two ends to provide communication between said manifold tube and said tuning tube.

* * * * *